United States Patent [19]
Nagata

[11] Patent Number: 5,116,016
[45] Date of Patent: May 26, 1992

[54] SUSPENSION DEVICE FOR AUTOMOTIVE SEAT

[75] Inventor: Kojiro Nagata, Akishima, Japan

[73] Assignee: Tachi-s Co., Ltd., Tokyo, Japan

[21] Appl. No.: 736,294

[22] Filed: Jul. 29, 1991

[30] Foreign Application Priority Data

Jul. 31, 1990 [JP] Japan ............................. 2-81634[U]

[51] Int. Cl.⁵ ............................................. F16M 13/00
[52] U.S. Cl. ..................................... 248/578; 248/543; 248/565; 248/564
[58] Field of Search ............... 248/578, 577, 608, 588, 248/564, 594.5, 543, 623, 624, 622, 406.2, 565, 575-576, 419; 297/345, 338

[56] References Cited

U.S. PATENT DOCUMENTS

| | | | |
|---|---|---|---|
| 2,534,047 | 12/1950 | McIntyre | 248/578 X |
| 2,680,472 | 6/1954 | Hempe, Jr. | 248/578 X |
| 2,893,470 | 7/1959 | Peller | 248/565 |
| 2,936,818 | 5/1960 | Harrington et al. | 248/543 |
| 3,888,451 | 6/1975 | Lacey | 248/543 X |
| 4,029,283 | 6/1977 | Swenson et al. | 248/543 X |
| 5,011,109 | 4/1991 | Nagata | 248/578 X |

Primary Examiner—Karen J. Chotkowski
Attorney, Agent, or Firm—Oldham, Oldham Wilson Co.

[57] ABSTRACT

A suspension device for automotive seat which is provided with a hydraulic damper and a compression coil spring wound therearound, such that the coil spring is adjusted in elastic repercussion force by way of worm gear and worm wheel so as to permit a fine adjustment of the repercussion force of the coil spring. A casing may be provided for housing the worm gear and worm wheel, and an indicator is formed on the casing. Below the casing, a scale plate having a desired plural graduation lines or marks is provided, to thereby precisely set a desired repercussion force of the spring.

5 Claims, 3 Drawing Sheets

SUSPENSION DEVICE FOR AUTOMOTIVE SEAT

BACKGROUND OF THE INVENTION

1. Field of the Invention

The present invention relates to a suspension device provided in an automotive seat, and in particular is directed to an improvement in the suspension device for automotive seat, which comprises a hydraulic damper with a coil spring wound therearound in order to adjust the cushionny effect according to a weight of an occupant on the seat.

2. Descrition of Prior Art

Typically, some of the hitherto suspension devices are of such a construction including an upper frame on which a seat cushion is mounted and a lower frame fixed on the floor side of the automobile, with an X-shaped link being movably interconnected with both of the upper and lower frames, so that the upper frame may be vertically move relative to the lower frame, wherein a hydraulic damper is interposed between the two frames for absorbing vibrations and rolling applied to the seat. In particular, there are a seat suspension device in which the hydraulic damper is provided with a compression coil spring therearound, which is adjustable in elastic reperecussion force at a proper degree matching to a particular weight of occupant sitting on the seat.

In this kind of suspension device, an upper annular support ring and a lower annular ring are provided at the respective upper and lower ends of the compression coil spring, such that the upper ring is disposed at the upper frame, whereas the lower ring is secured at the hydraulic damper, whereby the spring is adjusted in repercussion force by contracting and expanding the spring thus sandwiched between the upper and lower support rings, so as to permit adjustment of such spring repercussion force according to the occupant's weight.

Specifically stated, in a typical adjustment mechanism of this particular suspension device, a cam is rotatably attached about a cylinder of the hydraulic damper for contact with a stopper provided thereon, and the foregoing lower support ring is fixed integrally with the upper edge of the cam. The lower annular edge of the cam is formed unevenly to present certain undulations or irregularities for a proper adjustment purpose, and the stopper is fixed on the outer surface of the cylinder for contact with such undulations. The cam is, at its outer peripheral surface, formed with a plurality of equidistant cylindrical insert parts for receipt of a rod-like jig for causing the cam to be rotated. In operation, the forward end of the jig is inserted into one of insert parts, and the jig is rotated in a direction circumferentially of the cylinder, with the result that the cam is rotated, causing vertical displacement of the lower support ring in accordance as the undulated cam surfaces of the cam rides on and along the end of stopper. Such vertical displacement of the lower support ring produces adjustable variations in spacing between the lower and upper support rings, to thereby increase and decrease the repercussion force of the abovementioned coil spring, whereby an occupant can adjust the cushiony conditions or height of the seat at an optimal degree matching to his or her weight.

However, the foregoing adjustment of the spring in repercussion force has to be made by use of a jig for insertion into the insert portions of cam, which results in a poor operation of the suspension device, and further in making it rather hard for an occupant to finely adjust the springs' repercussion force.

Furthermore, the occupant has to adjust the spring's repercussion force, after having bending his body forwardly while sitting on the seat, for access to the operation knob disposed under the seat cushion. As a result, his or her weight at normal sitting posture becomes different from that at such forwardly bending posture, and consequently, the weight is not fully imparted to the compression coil spring, which prevents the occupant from making a precise adjustment for the repercussion force, according to his and her weight.

SUMMARY OF THE INVENTION

In view of the above-stated drawbacks, it is therefore a first purpose of the present invention to provide an improved suspension device for automotive seat, which enables an occupant on the seat to easily make a fine adjustment of cushiony conditions and height of the seat, without use of any jigs.

For such purpose, according to the present invention, it is arranged that a compression coil spring is wound about a hydraulic damper and supported by upper and lower support members, that under the lower support member, there is provided a worm wheel in a manner allowing the worm wheel to be movable vertically along and rotatable about the damper, with a worm gear being meshed with such worm wheel, and that an operation knob is fixed to the worm gear.

Accordingly, rotational operation of the knob actuates those worm gears and lower support member to adjust the repercussion force of the coil spring in a fine way.

It is a second purpose of the present invention to make a precise adjustment for the repercussion force of the compression coil spring.

To this end, a casing or dust cover is provided fast at the lower support member, for housing those worm gear and worm wheel therein, and an indicator is formed at the casing, whereas a cam means is provided movably at the damper for operative connection with the worm wheel and lower support member. To such cam means, a scale plate is fixed in oder to permit easy reading of an optimal degree of repercussion force of coil spring with reference to the indicator pointing to graduation marks or lines given in the scale plate.

DETAILED DESCRIPTION OF PREFERRED EMBODIMENTS OF THE INVENTION

Figure 1:
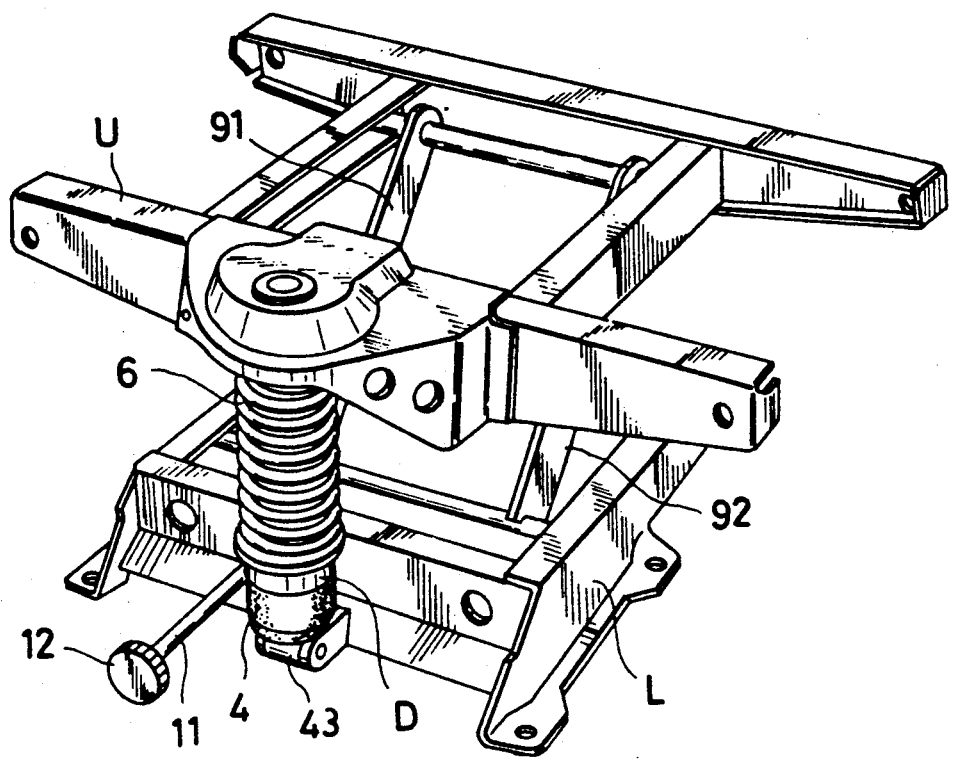
FIG. 1 is a schematic perspective view of a suspension device for automotive seat in accordance

Referring to FIG. 1, there is illustrated one embodiment of suspension device for automotive seat in accordance with the present invention.

In this figure, the designation (U) refers to an upper frame on which a seat cushion (not shown) is mounted, and designation (L) refers to a lower frame fixed on a floor of automobile or a slide rail (not shown) fixed on the floor. The upper frame (U) is connected via a pair of x-shaped links to the lower frame (L) such that the former frame (U) is free to move vertically relative to the latter frame (L).

Figure 2:
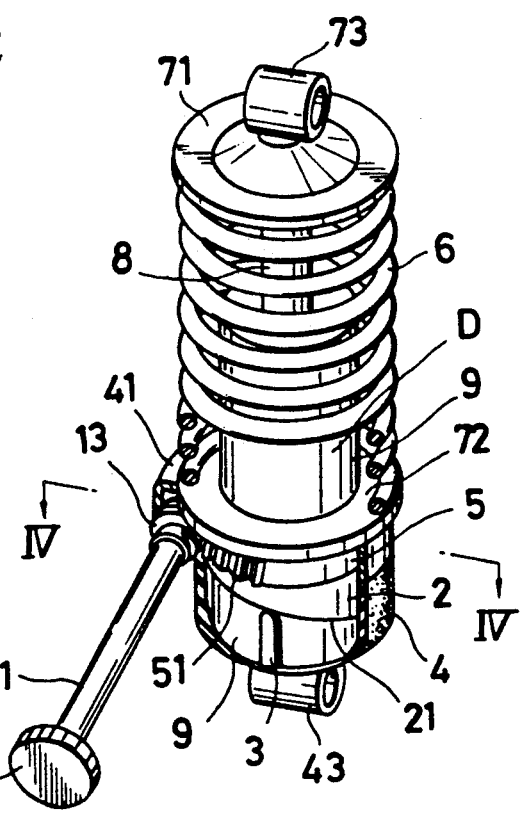
FIG. 2 is a partially broken perspective view of a hydraulic damper with a compression spring being wound therearound.

Interposed between and connected with those upper and lower frames (U) (L) is a hydraulic damper (D) in a generally perpendicular way relative to the floor of automobile, with a compression coil spring (6) being wound around the damper. As best seen from FIGS. 2, 3 and 4, the damper (D) is comprised of a cylinder body (9) in which an oil is accommodated, and a piston rod (8) projected movably from the top the cylinder body (9), with the arrangement that the foregoing compression coil spring (6) is wound around the upper half part of the cylinder adjacent to the side of the piston rod (8). The spring (6) is retained at the damper (D) by being at its upper end secured to an upper support member (71) provided at the upper end of piston rod (8), and further by being at its lower end secured upon a lower annular support member (72). The lower annular support member (72) is attached about the peripheral surface of the cylinder body (9) in a manner to be movable in a vertical direction corresponding to the axial direction of the cylinder body (9). Underside of such lower annular support member (72), there are provided a cylindrical cam (2), a combination of worm gear and worm wheel (5) (13), and a bearing casing (4) accommodating those worm gear (5) and worm wheel (13) therein. Both lower annular support member (72) and bearing casing (13) are made of a metallic material, and formed together integrally.

The cylindrical cam (2) is attached movably about the peripheral surface of cylinder body (9) such as to be free to move in both directions circumferentially and axially of the cylinder body (9). Fixedly provided on the cam is the worm wheel (5) which has formed part-way therein a toothed area (51) of worm-gear configuration. The lower edge of the cam (2) is formed with a contact edge (21) contoured in slant way in the vertical direction of cylinder (9), as in a known adjustable hydraulic damper, the contact edge (21) being adapted for contact with the stopper (3). By virtue of such contact between the contact edge (21) and stopper (3), those cam (2), worm wheel (5), and lower support member (72) are retained against movement, so that a given spacing has been attained between the the upper and lower support members (71) (72) to thereby keep a given repercussion force of the coil spring (6).

The stopper (3), as shown, is formed on the lower peripheral surface of cylinder body (9), however, though not shown, another stopper is formed on the opposite side of the same cylinder body's peripheral surface, for contact with the contact edge (21) of cam (2).

It is noted that the upper edge of cam (2) is merely in contact with the lower support member (72) and thus the cam (2) is rotatable independently of the lower support member (72). Hence, the lower support member (72), by reason of its being integral with the bearing casing (4), is prevented against rotation around the cylinder body (9). Stated more specifically in this respect, the casing (4), which may be referred to as a dust cover or housing, is fixedly mounted to the cylinder body (9), comprising a bearing section (41), which is preferably made of a metallic material, and a flexible section (41a) which is preferably made of a rubber material. The bearing section (41) is formed at the upper end of the casing (4) and defines therein a hollow (42) for supporting and accommodating the worm gear (13) in a manner allowing rotation of the worm gear therein, the worm gear (13) being in mesh with the aforementioned toothed area (51) of worm wheel (5).

Preferably, the bearing section (41) is fixed to the lower surface of cylinder body (9) by means of a suitable bracket or the like.

The flexible section (41a) is at its upper end fixed integrally to the lower end part of bearing section (41), and at its lower end fixed to the bottom of the cylinder body (9). The flexible section (41a) is resiliently expandable or contractable, such as to be stretchable over the lower region of the cylinder body (9), irrespective of the bearing section (41) being moved vertically or in the axial direction of the cylinder (9), as will be explained later.

An operation spindle (11) is connected integrally to the worm gear (13), with an operation knob (12) provided on the free end of spindle (11).

Designations (73) and (43) denote an upper connecting part integral with the foregoing upper support member (71), and a lower connecting part integral with the lower end of foregoing flexible section (41a) associated with the casing (4). The upper connecting part (73) is adapted to be connected with the upper frame (U), and the lower connecting part (43) is adapted to be connected with the lower frame (L).

Figure 3:
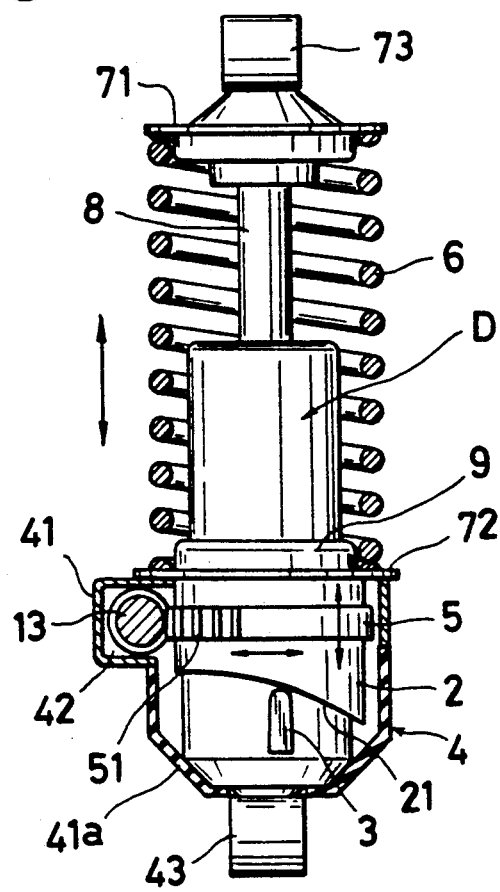
FIG. 3 is partly cut-away plan view of a principal part of the hydraulic damper as in FIG. 2.
Figure 4:
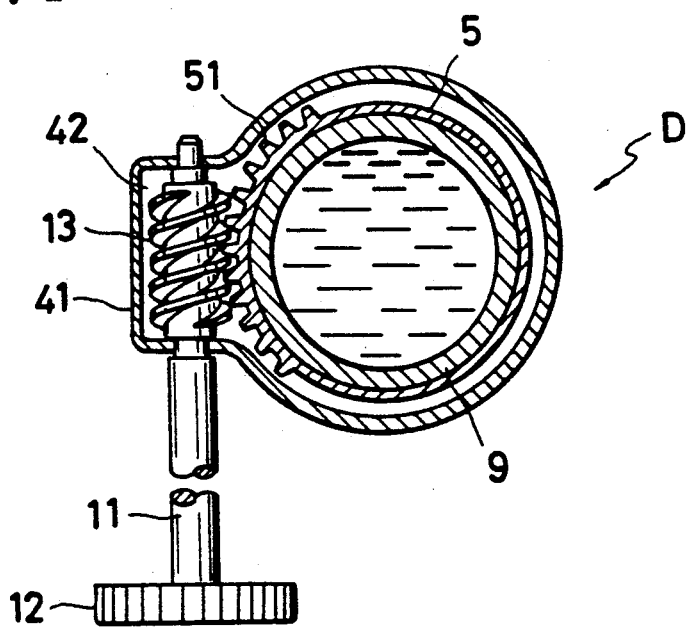
FIG. 4 is a sectional view taken along the line IV—IV in FIG. 2.

With above-described construction, rotation of the knob (12) causes simultaneous rotation of worm gear (13), since the knob (12) is integral with the worm gear (13) via the spindle (11), thus resulting in both worm wheel (13) and cam (2) being rotated about the cylinder body (9) in either of the arrow directions as shown in FIG. 3, with the result that the cam (2) per se is varied in height as its contact edge (21) is riding upon the stopper (3), which means that the cotact position of the cam (2) relative to the stopper (3) is shifted upwardly and downwardly. This vertical displacement of cam (2) also causes the lower annular support member (72) to be moved vertically, and simultaneously causes the bearing section (41) of casing (4) to be moved in the same vertical direction, whereupon the compression coil spring (6) is contracted and expanded by that lower support member (72), thereby changing the elastic repercussion force of the spring (6). During this operation, in response to the vertical displacement of the bearing section (41) of casing (4), the flexible section (41a) of same casing (4) is resiliently expanded or collapsed, allowing such bearing section's vertical displacements. An occupant sitting on the seat suspension device can therefore adjust the cushiony condition and height of the seat according to his or her weight.

Accordingly, in this particular embodiment, it is appreciated that the repercussion force of the compression coil spring may be varied by simply rotating the operation knob, which enables an occupant on the seat to easily adjust the height of seat as well as the cushiony condition of same at a degree matching to his or her weight. Thus, a practical feasibility for the seat suspension is greatly improved, making far easier the operation thereof.

Additionally, the meshed engagement between the worm gear and worm wheel realizes fine adjustment of the compression coil spring in its repercussion force, thus allowing for the fine adjustment of the seat height and the like.

Figure 5:
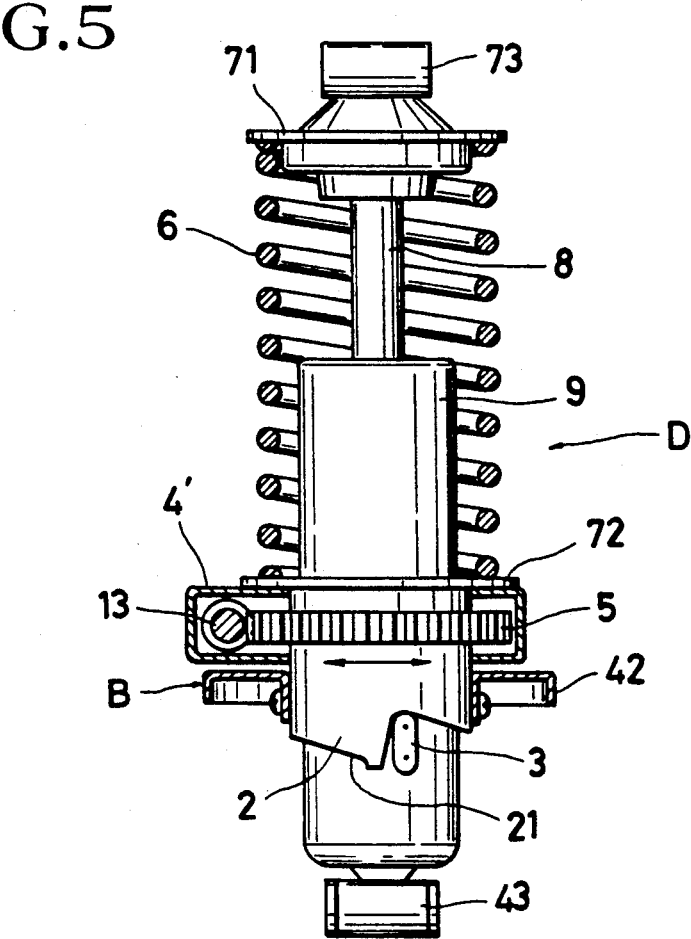
FIG. 5 is partly cut-away plan view of another emodiment of the present invention, showing an indicator and scale plate to be provided on the hydraulic damper.
Figure 6:
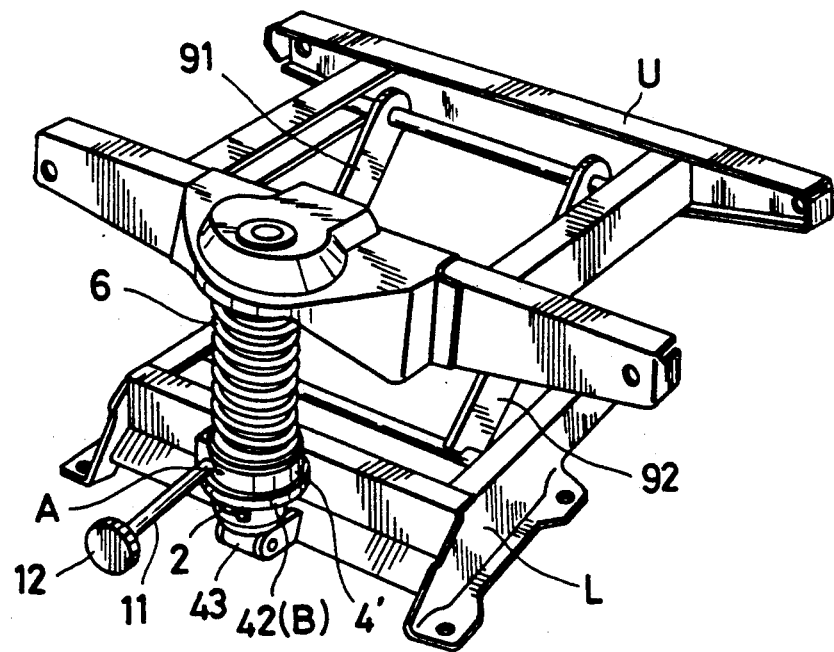
FIG. 6 is a schematic perspective view of such another embodiment as shown in FIG. 5, showing a suspension device to be provided with the damper.

Reference is made to FIGS. 5 and 6 which show another embodiment of the present invention. According thereto, the basic construction of the damper (D) is similar to the above-described embodiment, except that a dust cover or bearing casing (4') is provided for housing therein the worm gear (13) and worm wheel (5), with an arrow-like indicator (A) formed on the casing (4') and an annular scale plate (42) is fixed on the cylindrical cam (2). Thus, this embodiment provides numerical reading of a degree of repercussive force of the spring (6), by use of such indicator (A) and scale plate (42).

It is noted that all like designations given in the foregoing first embodiment correspond to all like designations for the herein description on this particular second embodiment, and therefore a description is deleted about the same elements and mechanisms between the two embodiments.

Specifically, the dust cover (4') is fixed to the lower annular support member (72), but independent from the cylindrical cam (2), so that the dust cover (4') is prevented against rotation about the cylinder body (9), while being permitted to be moved vertically along the axial direction of cylinder body (9). Below the dust cover (4'), the scale plate (22) is fixed on the outer peripheral surface of the cam (2). The scale plate (42) is provided with plural graduation lines (B), peripherally thereof. As can be seen from FIG. 6, the indicator (A), which is disposed forwardly and centrally of the dust cover (4'), points to the graduation lines (B) of the scale plate (42) thereblow, whereby an occupant on the suspension device can easily read a degree of repercussion force for the coil spring (6). For that purpose, the graduation lines (B) should preferably be formed for indicating weights matching to a corresponding repercussion force of the spring (6).

Accordingly, since the scale plate (42) is fixed to the cam (2), rotation of the operation spindle (11) causes simultaneous rotation of the scale plate (42) through the worm gears (13, 5) and cam (2), while on the other hand the indicator (A) stands stationary for pointing to the graduation lines (B) being shifted from one to another.

With this scale reading system in view, the circumference of worm wheel (5) is wholly formed with plual worm-gear teeth, so that all of the graduation lines (B) can be read by turning the operation spindle (11).

In operation, to rotate the operation knob (12) will cause the worm gear (13) integral therewith to be rotated, and simultaneously with such worm gear's rotation, the worm wheel (5) meshed with the worm gear (13) is rotated, thereby causing rotation of the cam (2) about the cylinder body (9). At this moment, needless to say, as described in the first embodiment above, the the cam (2) is displaced vertically due to its contact with the stopper (3), and thus the lower support member (72) is subject to the like-wise vertical displacements for adjustably varying the repercussion force of spring (6). Further, with the cam rotation, the scale plate (42) fixed on the cam (2) is also simultaneously rotated about the cylinder body (9), shifting its graduation lines in reference to the indicator (A) formed on the dust cover (41).

In this regard, let us assume that a certain graduation line is set as "B" among other lines, indicating a maximum compressed state of spring (6) (for example, a compressed degree of the spring matching to a particular weight of an occupant who sits on a seat mounted on the present suspension device). Then, the occupant will have to rotate the knob (12) in order that the "B" graduation line appears in alignment with the indicator (A), for attaining an optimal cushiony effect and seat height level for his or her weight.

Accordingly, in accordance with the present second embodiment, the formation of indicator on the dust cover as well as provision of scale plate on the cam will help the occupant to set numerically a given degree of repercussion force of the coil spring by rotating the knob, considering his or her particular weight. The occupant therefore can make adjustment of suspension device, precisely and quickly, at an optimal degree matching to his or her weight, which solves the previously discussed problems of prior art.

Finally, it should be understood that the present invention is not limited to the embodiments illustrated but any other modifications, replacements and additions may structurally be possible without departing from the scope and spirit of the appended claims.

What is claimed is:

1. A suspension device for automotive seat, comprising:

an upper frame on which said seat is mounted;
a lower frame fixed on a side of floor of an automobile;
a hydraulic damper provided between said upper and lower frames, said hydraulic damper having a cylinder body and a piston rod projected movably form said cylinder body;
a compression coil spring which is wound around the piston rod side of said hydraulic damper, said spring being adjustable in elastic repercussion force;
an upper support means disposed upon an upper end of said compression coil spring;
a lower annular support means attached movably about said hydraulic damper such as to be vertically movable therealong, said lower support member being disposed at a lower end of said compression coil spring;
said upper and lower support means being adapted for supporting the respective upper and lower ends of said coil spring;
a stopper fixed on said cylinder body of said hydraulic damper;
a cam means which is attached about said cylinder of said hydraulic damper, such that said cam means is rotatable about said cylinder in contact with said stopper means so as to cause vertical displacement of said lower support means;
a worm wheel which is integrally provided on said cam means;
a worm gear meshed with said worm wheel; and
an operation knob connected integrally with said worm gear,
wherein rotational operation of said knob causes said cam means to be rotated about and displaced vertically along said cylinder body, thereby effecting said vertical movement of said lower support means along said hydraulic damper and thus allowing adjustment of said coil spring in repercussion force according to a weight of an occupant sitting on said seat.

2. The suspension device as defined in claim 1, wherein said upper frame is connected via an X-shaped link to said lower frame, so that said upper frame may be raised and lowered relative to said lower frame, and wherein said hydraulic damper is disposed forwardly of said upper and lower frames in a generally perpendicular way relative to said floor.

3. The suspension device as defined in claim 1, wherein said cam means comprises a cylindrical cam movably attached about an outer peripheral surface of said cylinder, and wherein said cylindrical cam is at its lower end formed an uneven contact edge for contact with said stopper means.

4. The suspension device as defined in claim 1, wherein a casing is provided over said hydraulic damper, such that said casing supports and accommodates therein said worm gear and worm wheel, wherein said casing includes a bearing section and a flexible section, wherein said bearing section is fixed integrally to said lower annular support member, for accommodating therein said worm gear and worm wheel, and said flexible section is at its one end fixed to said bearing section and at its another end fixed to a lower end of said hydraulic damper, said flexible section being elastically expandable and collapsible, and wherein said bearing section may be moved together with said cam means and lower support member.

5. The suspension device as defined in claim 1, wherein threre is provided a casing or a dust cover for housing therein said worm gear and worm wheel, such that said casing is fixed to said lower annular support member and independent from said cam means, thus allowing said casing to be only movable vertically together with cam means, wherein an indicator is formed on said casing, and wherein a scale plate having plural graduation lines or marks is fixed to said cam means.

* * * * *